United States Patent [19]
Gilligan, III et al.

[11] Patent Number: 5,661,768
[45] Date of Patent: Aug. 26, 1997

[54] SPENT NUCLEAR FUEL (SNF) DRY TRANSFER SYSTEM

[75] Inventors: Bernard Gilligan, III, Norfolk; Clinton W. Stallard, III, Hampton; James E. Steinke, Smithfield; Richard K. Feamster, Jr., Gloucester, all of Va.

[73] Assignee: Newport News Shipbuilding and Dry Dock Company, Newport News, Va.

[21] Appl. No.: 593,158

[22] Filed: Feb. 1, 1996

Related U.S. Application Data

[62] Division of Ser. No. 336,503, Nov. 9, 1994.

[51] Int. Cl.⁶ ........................................... G21C 19/00
[52] U.S. Cl. .......................................... 376/261; 376/272
[58] Field of Search .................... 376/272, 262, 376/271, 261, 269; 250/506.1, 507.1

[56] References Cited

U.S. PATENT DOCUMENTS

| | | | |
|---|---|---|---|
| 3,819,066 | 6/1974 | Jones | 376/272 |
| 3,917,953 | 11/1975 | Wodrich | 376/272 |
| 4,069,923 | 1/1978 | Blumenau et al. | 376/272 |
| 4,543,488 | 9/1985 | Diem | 376/272 |
| 5,063,299 | 11/1991 | Efferding | 376/272 |
| 5,114,666 | 5/1992 | Ellingson et al. | 376/272 |
| 5,319,686 | 6/1994 | Pizzano et al. | 376/272 |
| 5,438,597 | 8/1995 | Lehnert et al. | 376/272 |

*Primary Examiner*—Daniel D. Wasil
*Attorney, Agent, or Firm*—Lalos & Keegan

[57] ABSTRACT

A dry transfer system for spent nuclear fuel (SNF) assemblies includes a transfer container with a sliding sleeve for vertical translation therein. The sliding sleeve includes a number of compartments for receiving a corresponding number of fuel assemblies. The container includes an integral and remotely controllable hoist with a number of individually actuated grapples for latching onto a corresponding number of fuel assemblies. The system further includes a loading stand with an elevator for raising and lowering a fuel basket that also includes a number of compartments for moving fuel assemblies up to and in alignment with the sleeve of the transfer container that is landed on the loading stand.

43 Claims, 17 Drawing Sheets

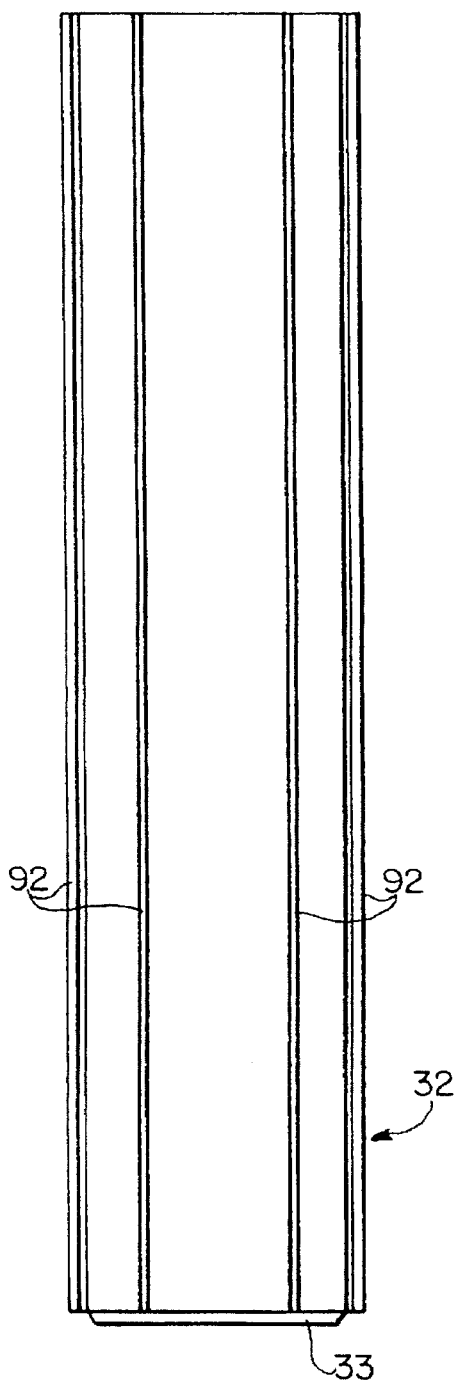
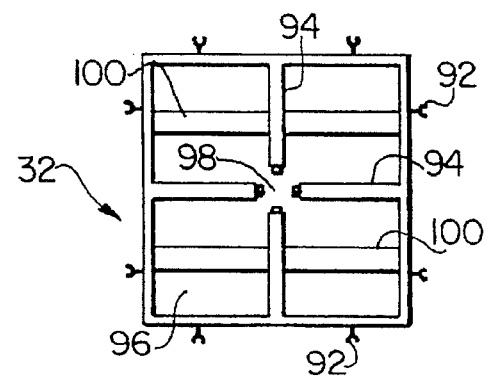
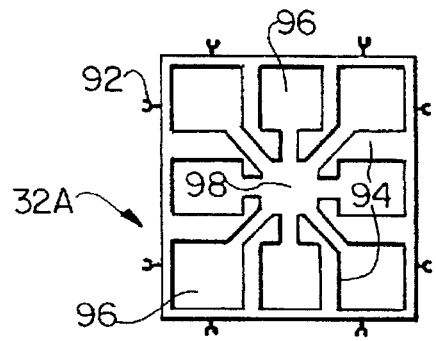
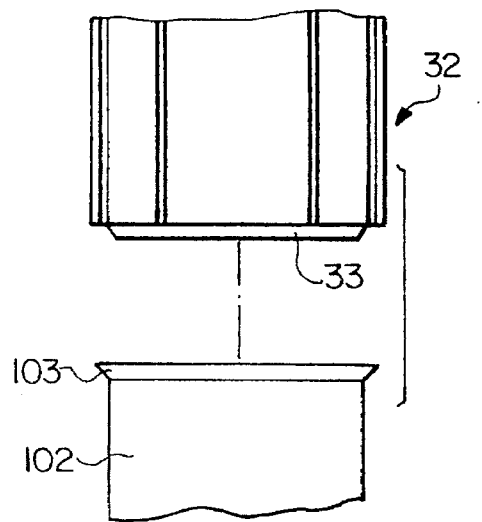
FIG. 11
FIG. 12
FIG. 13
FIG. 14

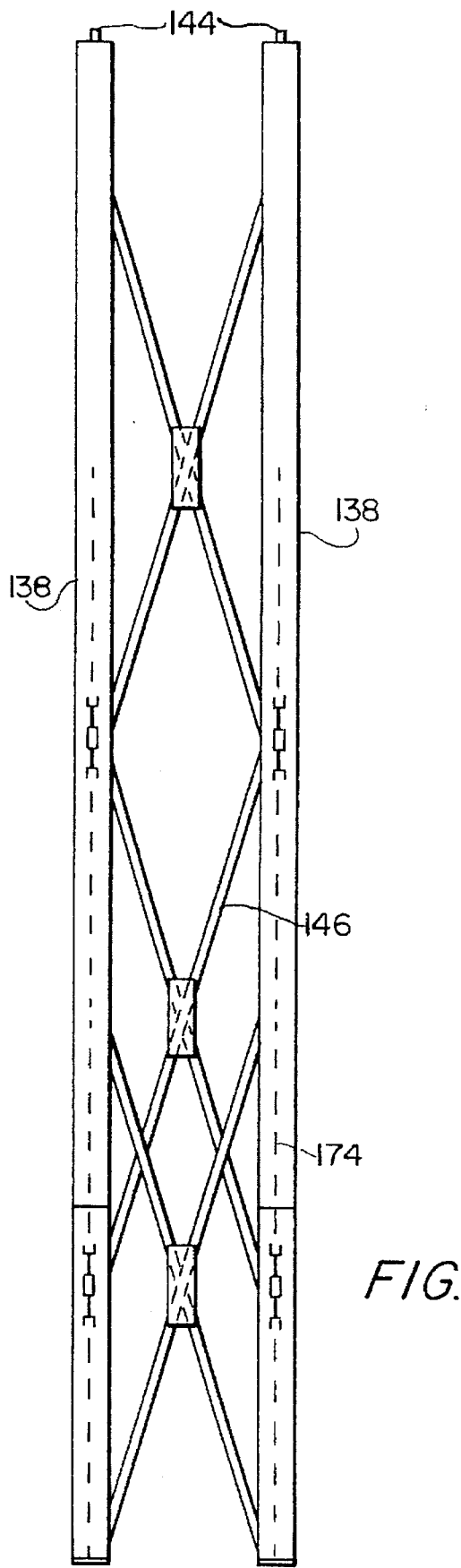
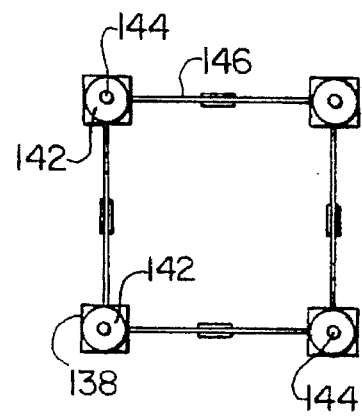
FIG. 21
FIG. 20

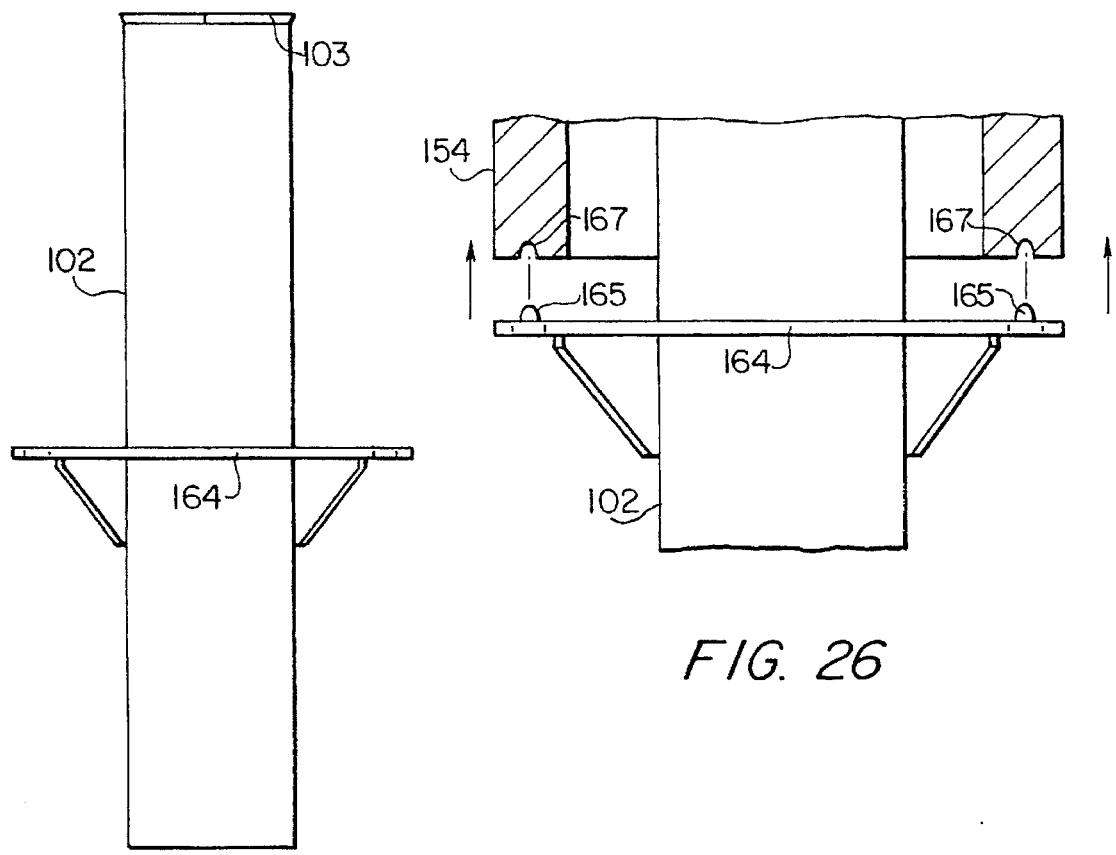
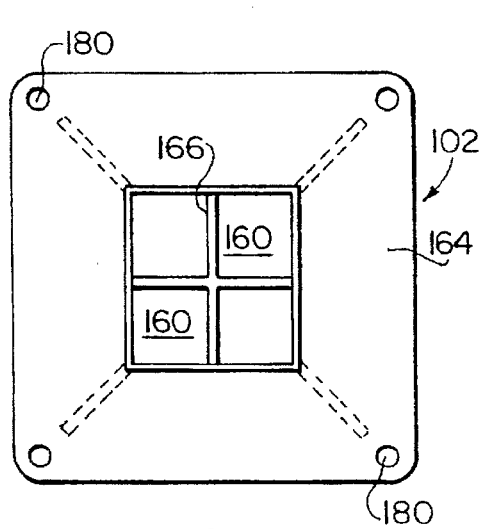
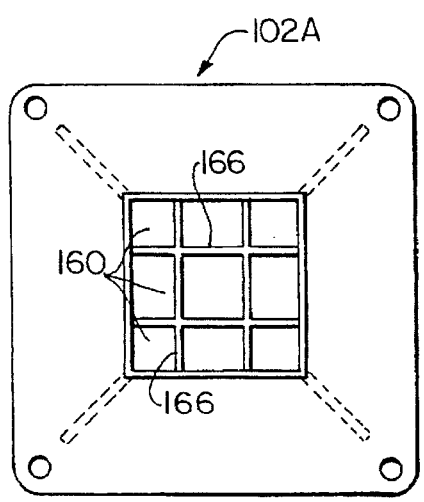
FIG. 23
FIG. 26
FIG. 24
FIG. 25

SPENT NUCLEAR FUEL (SNF) DRY TRANSFER SYSTEM

This is a divisional of copending application Ser. No. 08/336,503 filed on Nov. 9, 1994.

FIELD OF THE INVENTION

This invention relates generally to the handling of spent nuclear materials and more particularly to the handling of spent nuclear fuel rods for transportation to storage areas, inspection areas, or for further treatment.

BACKGROUND OF THE INVENTION

The generation of power from nuclear materials has been well known in the art for many decades. The nuclear material, after a period of use for power generation, is incapable of generating the energy necessary and must be removed from its nuclear reactor. The major component of used nuclear material is spent nuclear fuel (SNF) rods. The transportation of such spent nuclear fuel rods has been a troubling problem over the decades and one that has not been solved entirely satisfactorily.

Spent nuclear fuel has the characteristic of emitting high amounts of radiation which is damaging to living tissue, particularly in humans. To handle the spent nuclear fuel safely, the fuel must be shielded with appropriate radiation shielding materials. Shielding materials, in general, are of a dense nature. To shield the radiation emitted from the spent nuclear fuel, shielded casks are used to maintain the exterior radiation levels at a sufficiently low level to prevent harm to personnel or the environment.

For transferring spent nuclear fuel to a transportation or storage cask, the current commercial industrial practice is an underwater or wet fuel transfer process which includes the step of submerging a cask into the nuclear fuel storage pool. Then, through the use of cranes and grappling hooks and the like, the spent nuclear fuel rods are transferred while still underwater into the submerged cask. The water acts as a radiation shield to protect personnel performing the transfer. The cask is then lifted from the storage pool, the interior of the cask is drained and dried, the outside is decontaminated and the cask is sealed.

An alternate method for the transfer of spent nuclear fuel rods is dry transfer. The current dry transfer system utilizes a transfer container to handle the spent nuclear fuel rods. A stand is placed under water in the spent nuclear fuel storage pool and the spent nuclear fuel rods are transferred to a position within the stand while still under water. The transfer container is landed on the stand and the bottom of the transfer container is opened by operating a translating gate. Then, a single spent fuel rod is raised through the bottom of and into the transfer container. This process is repeated to load the transfer container. Then, the transfer container is sealed by closing a translating gate and the transfer container is transported to a discharge stand. The transfer container is seated on the discharge stand and the translating gate is operated to open the bottom of the transfer container. A single spent fuel rod is lowered out of the transfer container and into a transportation cask located in the discharge stand. This process is repeated until all the spent nuclear fuel rods are removed from the transfer container and placed into the cask. Such method is disclosed in commonly assigned U.S. Pat. No. 5,319,686 to Pizzano et al, which patent is incorporated in its entirety herein by reference.

The wet fuel transfer process utilizes casks which are too large to be handled at many fuel storage sites because of constraints on existing lifting and handling resources. In addition, the wet fuel transfer process requires the exterior of the submerged cask to be cleaned or decontaminated to remove radioactive particles which increases the process time and the possible exposure of operating personnel to radiation and radioactive contamination.

The current dry fuel transfer process requires personnel to be located atop the transfer container to manipulate fuel handling tools and the like. Consequently, to protect the personnel atop the container, the transfer container must provide adequate shielding of the radiation being emitted by the spent nuclear fuel rods. This in turn increases the weight of the transfer container and its exterior dimensions which prevents its use at some fuel storage sites with limited lifting and handling capabilities. Also, grapple actuating tools penetrate the transfer container which hinders containment of any potential radioactive off-gases in the transfer container. In addition, the transfer container is only capable of raising or lowering one spent nuclear fuel (SNF) rod at a time. During the raising process, the SNF rods are not constrained from lateral motion after they are removed from the loading stand and prior to entering the transfer container. Also, during the lowering process, the SNF rods are not constrained from lateral motion after they are lowered from the transfer container and prior to entering the storage or transportation container.

SUMMARY OF THE INVENTION

The dry fuel transfer system of the present invention allows the transfer of spent nuclear fuel rods in the dry condition, while using a remote means to control and operate the system. The use of a remote control allows a reduction in personnel and allows personnel to remain a safe distance from the transfer container and thereby reduces the amount of radiation shielding material required and the radiation dosage to operating personnel. Consequently, the weight and overall dimensions of the transfer container are reduced to allow use of the present invention at all fuel storage sites without modification to their existing lifting and handling apparatus. Also, the dry fuel transfer system of the present invention permits raising or lowering of a number of nuclear fuel rods simultaneously. This greatly reduces the process time and thereby the radiation exposure of personnel. In addition, the proposed system does not require the penetration of any fuel handling tools or the like, which enables the transfer container to be sealed easily. The remote operation of the transfer container only requires one operator. Also, the improved system of the present invention ensures that the SNF assemblies are constrained from lateral motion during all of the fuel handling movements.

BRIEF DESCRIPTION OF THE DRAWINGS

FIG. 11 is an elevational view of the sliding sleeve of the present invention.

FIG. 12 is a plan view of the sliding sleeve.

FIG. 13 is a plan view of an alternate or auxiliary sliding sleeve.

FIG. 14 illustrates the mating/aligning feature of the sliding sleeve and the fuel basket.

FIG. 20 is an elevational view of the loading stand support columns of the present invention.

FIG. 21 is a plan view of the loading stand support columns.

FIG. 23 is an elevational view of the fuel basket of the present invention.

FIG. 24 is a plan view of the fuel basket.

FIG. 25 is a plan view of an alternate or auxiliary fuel basket.

FIG. 26 is an elevational view showing the mating/ alignment of the fuel basket with the transition shield.

DETAILED DESCRIPTION

A dry fuel transfer system generally comprises three main elements: the loading stand assembly which is placed partially under water in the spent nuclear fuel (SNF) storage pool and into which SNF rods or fuel assemblies are transferred; the transfer container which is landed on the loading stand and into which fuel assemblies are transferred from the loading stand assembly; and the discharge stack-up which includes a discharge stand onto which the transfer container is landed, and a transportation cask into which fuel assemblies are transferred from the transfer container.

Figure 1:
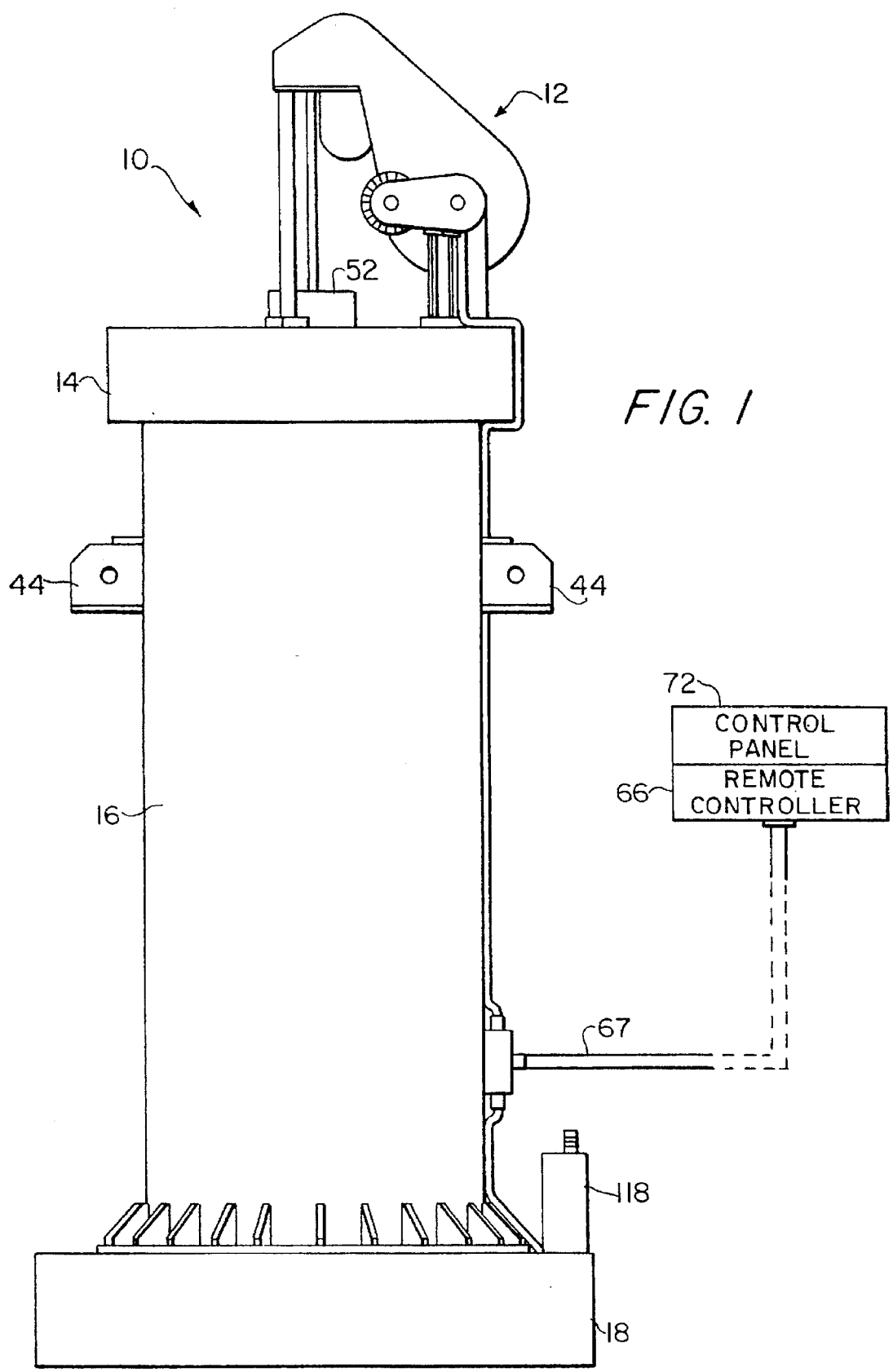
FIG. 1 is an elevational view of the transfer container of the present invention.
Figure 2:
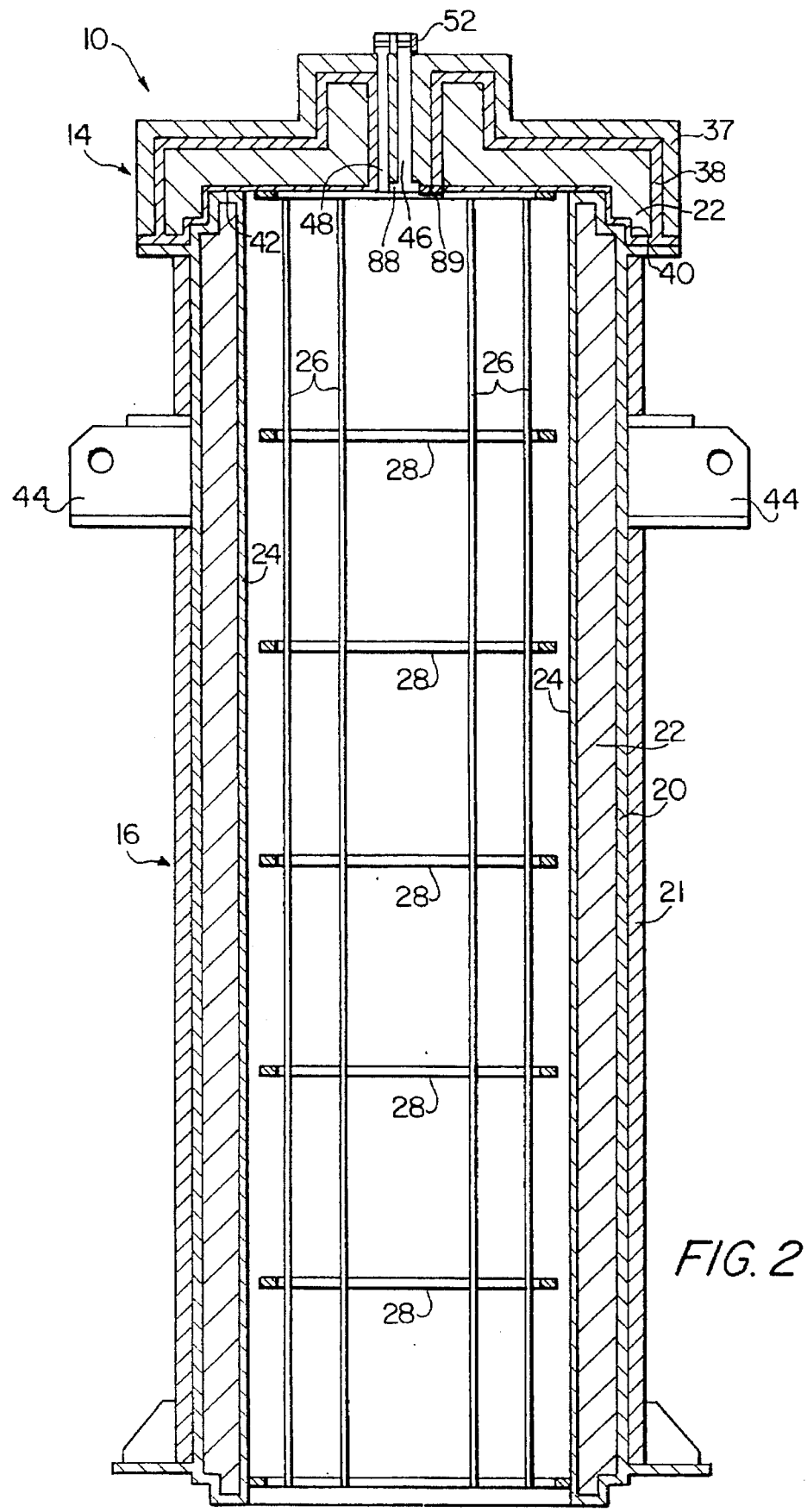
FIG. 2 is a cross-sectional view of the body and closure head of the transfer container.
Figure 3:
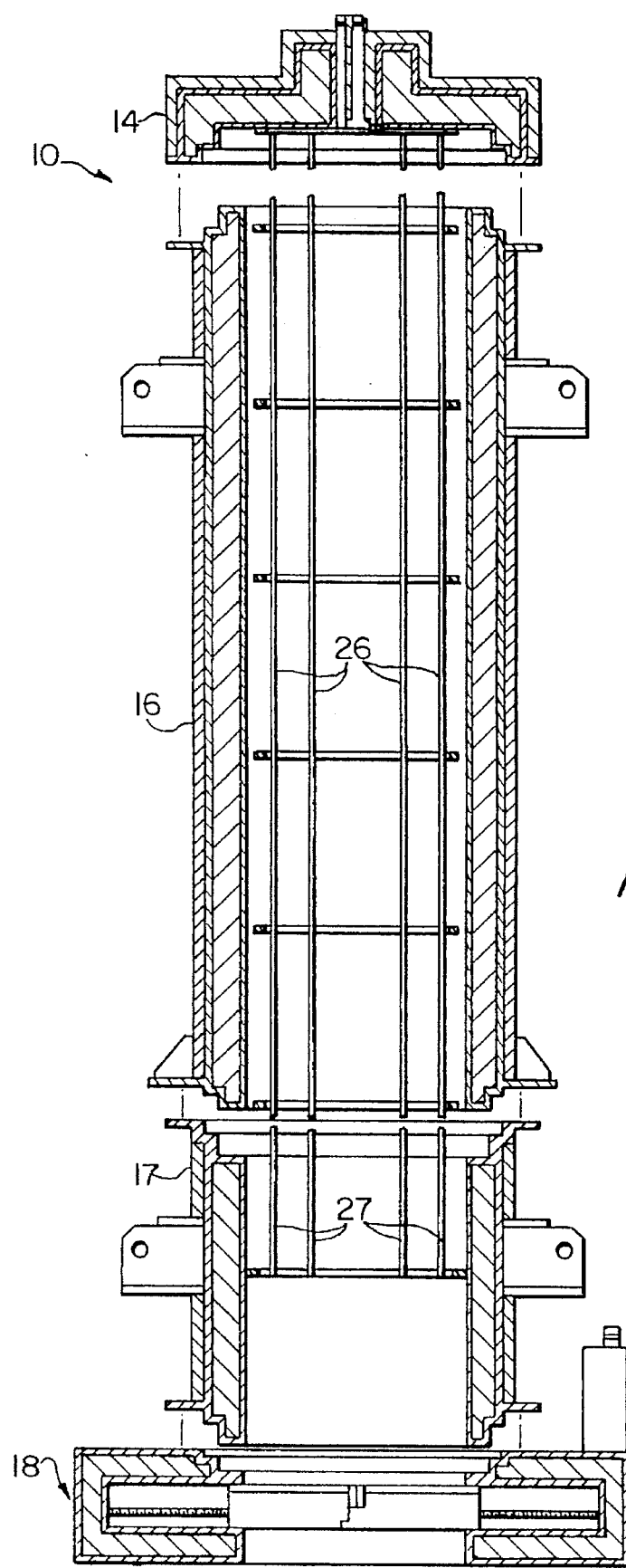
FIG. 3 is a cross-sectional view of the transfer container with an exploded view showing the container body extension of the present invention.

The transfer container 10 is shown in FIG. 1. It includes an integral hoist 12 attached to closure head 14, a main container body 16 and a shielded gate 18. FIG. 2 shows the container body 16 and closure head 14 in greater cross-sectional detail. The transfer container body 16 is preferably a cylindrical shell that is rabbeted at each end to fit with and fasten to closure head 14 and shielded gate 18 (FIG. 3). The fastening means (not shown for clarity) may be any conventional means such as a bolted flange joint. The container body 16 includes neutron shielding 21 (FIG. 2), a steel, exterior strength shell 20, shielding material 22 and a light steel, interior shell 24 that contains the radiation shielding material 22. Selection of the type of material 22 and thickness as defined by interior shell 24 will depend on the amount of radiation expected to be emitted by the particular fuel assemblies that will be carried in the transfer container.

The interior of body 16 is provided with guide rails 26 that are attached at their upper end to closure head 14 and supported along their length by body supports 28. Guide rails 26 provide a locating sliding fit for a sliding sleeve 32 (see FIG. 11—omitted from FIG. 2 for clarity) that translates vertically within body 16. The exterior of transfer container body 16 has mounted thereon at least two lifting structures 44, well known in the art, located 180 degrees apart for hoisting and erecting the transfer container. As illustrated in FIG. 3, transfer container body 16 can be adapted to extend its length with the addition of one or more container body extensions 17, that also include extensions 27 for guide rails 26. This feature allows the transfer container to be easily adapted to accommodate varying lengths of fuel assemblies in a variety of applications.

Figure 7:
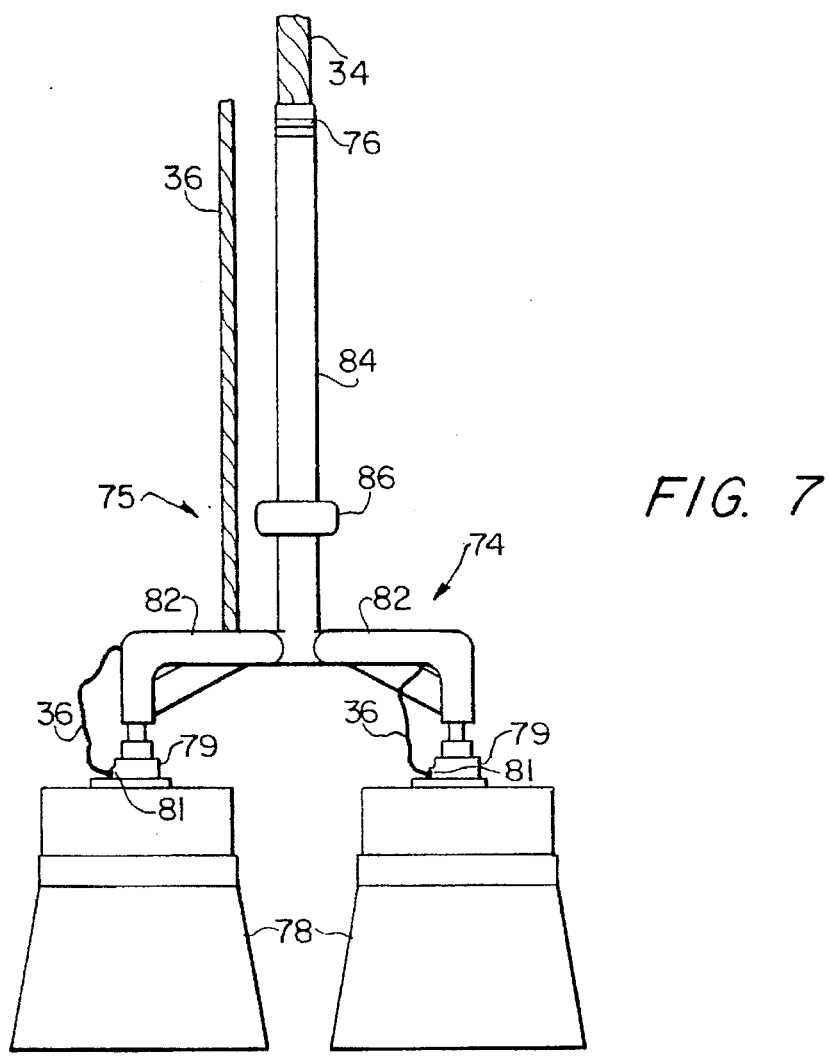
FIG. 7 is an elevational view of the grapple assembly of the present invention.

Closure head 14 (FIG. 2) forms the top of transfer container 10, provides mounting support for integral hoist 12 (FIG. 4) and holes with tight clearance fittings for the hoist cable 34 and grapple control cable 36 (FIG. 7). The closure head 14 is constructed the same as body 16 with neutron shielding 37, a steel, exterior strength shell 38, radiation shielding material 22 and a light steel interior shell 40 that contains material 22. The lower surface 42 of closure head 14 is cup-shaped with a rabbeted surface for mating with and extending over the upper end of body 16. The rabbeted fit ensures that radiation must pass through a sufficient amount of shielding to protect personnel. Two holes, or vertical channels, 46 and 48 pass through closure head 14 to provide tight clearance passage of hoist cable 34 and grapple control cable 36, respectively. These holes receive cables 34 and 36 through a seal assembly 52.

Figure 4:
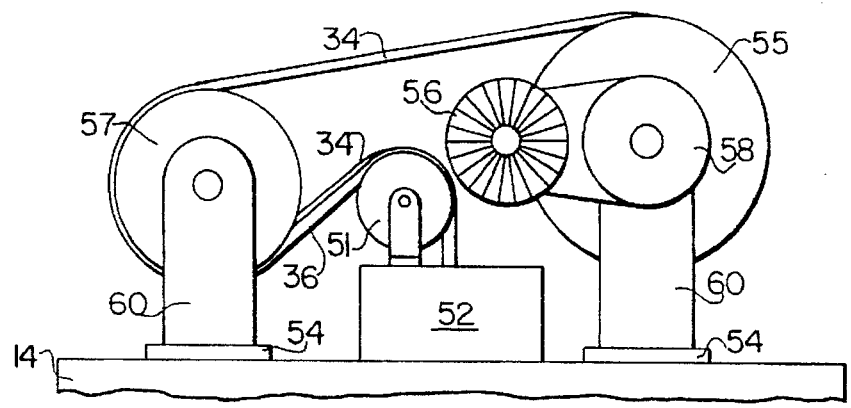
FIG. 4 is a side elevational view of a preferred embodiment of the integral hoist of the present invention.
Figure 5:
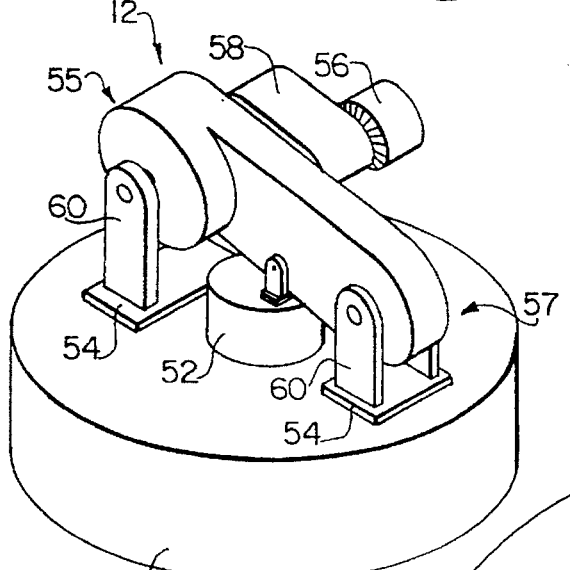
FIG. 5 is a perspective view of the preferred integral hoist.
Figure 6:
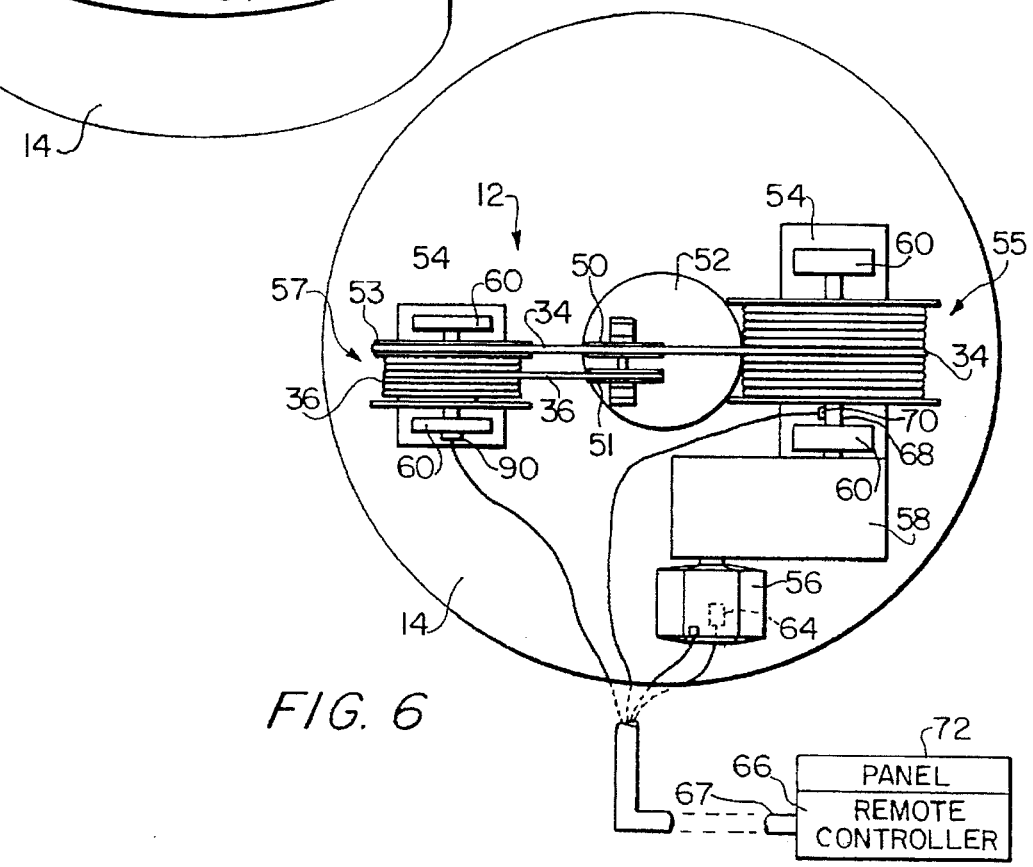
FIG. 6 is a top view of the preferred integral hoist.

The integral hoist 12 is shown generally in FIG. 1, but a preferred embodiment is shown in the several views of FIGS. 4 through 6. Hoist 12 is an electrically driven cable and drum hoist that is mounted on the top of closure head 14 via mounting plates 54. Hoist 12 includes two drums 55 and 57 that store the hoist lift cable 34 and the grapple control cable 36, respectively. Preferably, hoist 12 utilizes current art single-failure proof technology to ensure that the load lifted by the hoist is not dropped due to hoist failure. Cables 34 and 36 are delivered from the stowage drums 55 and 57 via pulleys 50, 53, and 51 and pass through seal assembly 52 and tight clearance passages or holes 46 and 48 of closure head 14 (FIG. 2). Hoist 12 includes motor 56 which, through gear box 58, drives the cable drum 55 directly and drum 57 indirectly through hoist cable 34 wound thereupon. Each of the drums 55, 57 are supported by drum mounting blocks 60. Motor 56 includes an integral rotary position encoder 64, shown only generally in phantom in FIG. 6, to provide data indicating the length of hoist cable 34 and/or grapple control cable 36 paid out from the cable drums. Position encoder 64 is connected electrically by cable to remote controller 66 to provide the length data to the controller and enable remote monitoring. Remote controller 66 is preferably a conventional computer with standard programming and input/ output (I/O) capabilities. Note that for purposes of illustration, individual cables are shown connected between hoist 12 and remote controller 66 but in actual practice all cables would be routed so that only a single, multi-wire cable 67 (FIG. 1) would connect between the remote controller 66 and transfer container 10. Motor 56 is also connected to controller 66 via the same cable 67 to enable remote actuation of hoist 12. As an additional monitoring feature, the connecting shaft 68 to the cable drum 55 includes a strain gauge bridge 70, shown generally in FIG. 6, for detecting the size of the load attached to the hoist cable. Bridge 70 is connected electrically by the same multi-wire cable 67 to remote controller 66, which is programmed by conventional techniques to determine from the load detected whether one or more fuel assemblies have been latched or released by grapple assemblies attached to the hoist cable. Remote controller 66 is preferably provided with a control panel and/or display 72 that indicates to an operator the length of the cables paid out from the drums, the load carried by the hoist cable (e.g. in pounds), and other indicators to be discussed further hereinafter. Control panel 72 will preferably also provide control switches or dials for activating the hoist motor 56 to raise and lower the hoist cable and attached grapple assembly.

Figure 8:
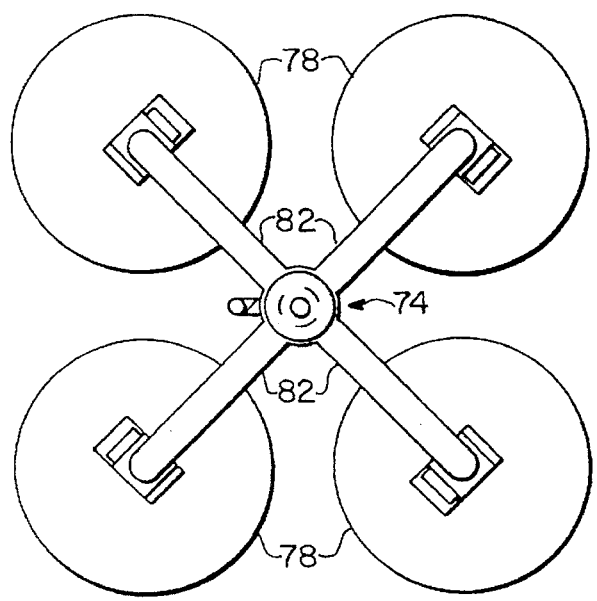
FIG. 8 is a plan view of the grapple assembly.

As shown in FIG. 7, the hoist cable 34 is attached, within container body 16, to common grapple bracket 74 of grapple assembly 75 via connector 76. FIGS. 28–31 give a perspective view of the grapple assembly within body 16. Common grapple bracket 74 has attached thereto a number of grapples 78 for latching and releasing spent nuclear fuel (SNF) assemblies or rods 80 (see, for example, FIG. 30). FIG. 8 shows an embodiment of the present invention with four grapples 78 connected to four arms 82 of the bracket 74. Grapple control cable 36 (FIG. 7) is routed along or through arms 82 to each of grapples 78. Central post 84 of bracket 74 is provided with a locking ring 86 that is received in an opening 88 in closure head 14 (FIG. 2). Ring 86 automatically trips grapple locking mechanism 89 (FIG. 2) within head 14 via a pin, lug, key or other suitable tripping device. Mechanism 89, which may be pneumatically, electrically, hydraulically or mechanically activated and released, latches ring 86 in position in opening 88. Ring 86 can be locked in position in opening 88 to lock the grapple assembly 75 in its fully retracted position with (FIG. 31) or without (FIG. 28) fuel assemblies attached. Thus, the grapple assembly can be held in its fully retracted position independent of the hoist 12.

Figure 9:
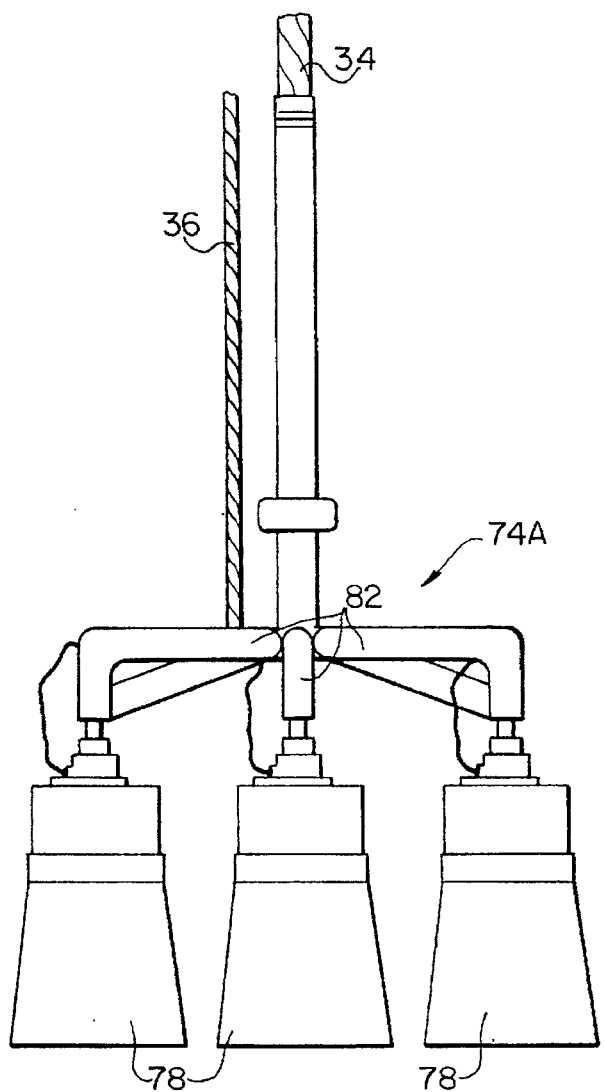
FIG. 9 is an elevational view of an alternate or auxiliary embodiment of the grapple assembly of the present invention.
Figure 10:
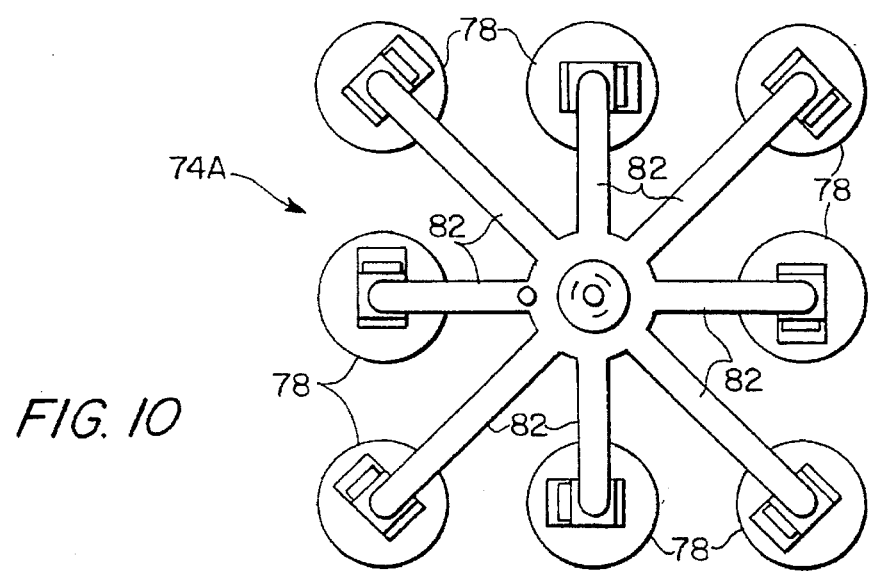
FIG. 10 is a plan view of the alternate or auxiliary grapple assembly.

Again with reference to FIGS. 7 and 8, a number of grapples 78 are connected to a respective number of arms 82 of common grapple bracket 74. Each grapple 78 functions to securely latch a fuel assembly 80, while it is hoisted into transfer container 10 and retained therein, while container 10 is moved, or while the fuel assemblies are lowered out of the transfer container and into a cask for storage or transport. Preferably, grapples 78 are actuated by electrical solenoids that are powered through grapple control and data cable 36. Pneumatic or mechanical actuation may also be employed. The control and data cable 36 is connected electrically to remote controller 66. This connection is shown for illustration purposes only in FIG. 6 with the control and data cable connector shown at 90. Preferably, however, all electrical cables will be routed within a single multi-wire cable with only a single multi-pin or multi-wire external connector for connecting with a single multi-wire cable 67 to controller 66. Each grapple 78 is individually actuated by remote controller 66 through operator action using control dials or switches on control panel 72. Panel 72 will preferably display indications of which grapples are actuated. Individual actuation of the grapples allow selective latching and hoisting in one embodiment, of only one, two, three or four fuel assemblies. This feature is useful in situations where, for example, one or two fuel assemblies are already contained in a storage or transportation cask and others are to be added from/to the transfer container. Grapples 78 are attached to the arms 82 of the common grapple bracket 74 by current art, commercially available, quick release fittings 79 and to the grapple control cable 36 by quick release connectors 81 so that the grapples 78 can be interchanged with another type of grapple suitable for different fuel assemblies. Thus, transfer container 10 can be readily reconfigured to suit various applications. FIGS. 9 and 10 illustrate an alternative or auxiliary common grapple bracket embodiment 74A with eight grapples 78 for holding up to eight fuel assemblies. Selection of a particular maximum number of fuel assemblies to be simultaneously maneuvered and held by transfer container 10 will depend on the particular application to which the present invention is applied.

The fuel assemblies are lifted into and out of container body 16 while positioned in a sliding sleeve 32, which is best shown in FIGS. 11 and 12. Sleeve 32 is a box shaped structure that translates (slides) on guide rails 26 vertically within body 16. In its uppermost position (FIG. 28), the top of sleeve 32 is raised up to closure head 14, and in its lowermost position (FIG. 30) the bottom of sleeve 32 is lowered outside of transfer container 10. Sleeve 32 contains a number of runners 92 that slide on guide rails 26 (FIG. 2) of body 16. As best shown in FIG. 12, sleeve 32 is internally divided along its length by walls 94 to provide a number of compartments 96 configured to receive a corresponding number of fuel assemblies. Sleeve 32 is preferably constructed in a geometrical configuration that effects a spatial relationship between fuel assemblies appropriate to ensure subcriticality of the fuel assemblies while in the transfer container. Such configuration must be determined for each application (i.e. type, shape, etc. of fuel assemblies to be handled) of the present invention using techniques well known in the art. Alternatively, or additionally, sleeve 32 (including walls 94) is constructed of a material which may contain boron (neutron poisons) as a component. Sliding sleeve 32 includes an opening 98 at the intersection of walls 94 that serves as passage for the common grapple bracket 74, hoist cable 34 and grapple control cable 36. FIG. 13 illustrates an alternate or auxiliary sliding sleeve embodiment 32A configured to accommodate up to eight fuel assemblies. In FIG. 13, lifting plates 100 are removed to better illustrate the relationship of walls 94 and configuration of the eight compartments 96. Sleeve 32 is moved up and down by and in conjunction with grapple assembly 75. Sleeve 32 includes lifting plates 100 that engage, with their lower surfaces, the upper surfaces of common grapple bracket arms 82. When grapple bracket 74 is raised by hoist 12, it engages lifting plates 100 thereby raising sleeve 32. When the grapple assembly 75 is locked in its uppermost raised position within body 16, sleeve 32 is securely retained by the locked bracket 74. When the common grapple bracket 74 is unlocked and lowered by integral hoist 12, sliding sleeve 32 descends by gravity as it is lowered by the common grapple bracket. When the lower end of sliding sleeve 32 mates with the upper end of the loading stand fuel basket 102 (see FIG. 30), it aligns with the fuel basket. As best seen in FIG. 14, sliding sleeve 32 aligns with fuel basket 102 through cooperation of flange 33 that seats inside of flanged lip 103 of fuel basket 102. When aligned with the fuel basket, the sliding sleeve 32 guides the common grapple bracket 74 as it is further lowered by the integral hoist 12 until the grapples 78 contact the standard latching features of the fuel assemblies contained in the loading stand fuel basket 104 and are actuated to latch the fuel assemblies. As the integral hoist 12 raises the common grapple bracket 74 and the latched fuel assemblies, the sliding sleeve 32 remains mated and aligned to the fuel basket 104 providing locational control of the fuel assemblies as they are lifted. The fuel assemblies are lifted fully into the sliding sleeve 32 whereupon the common grapple bracket 74 engages the top of the sliding sleeve 32 and causes the integral hoist 12 to retract the sliding sleeve 32 with the latched fuel assemblies into the transfer container 10.

Figure 15:
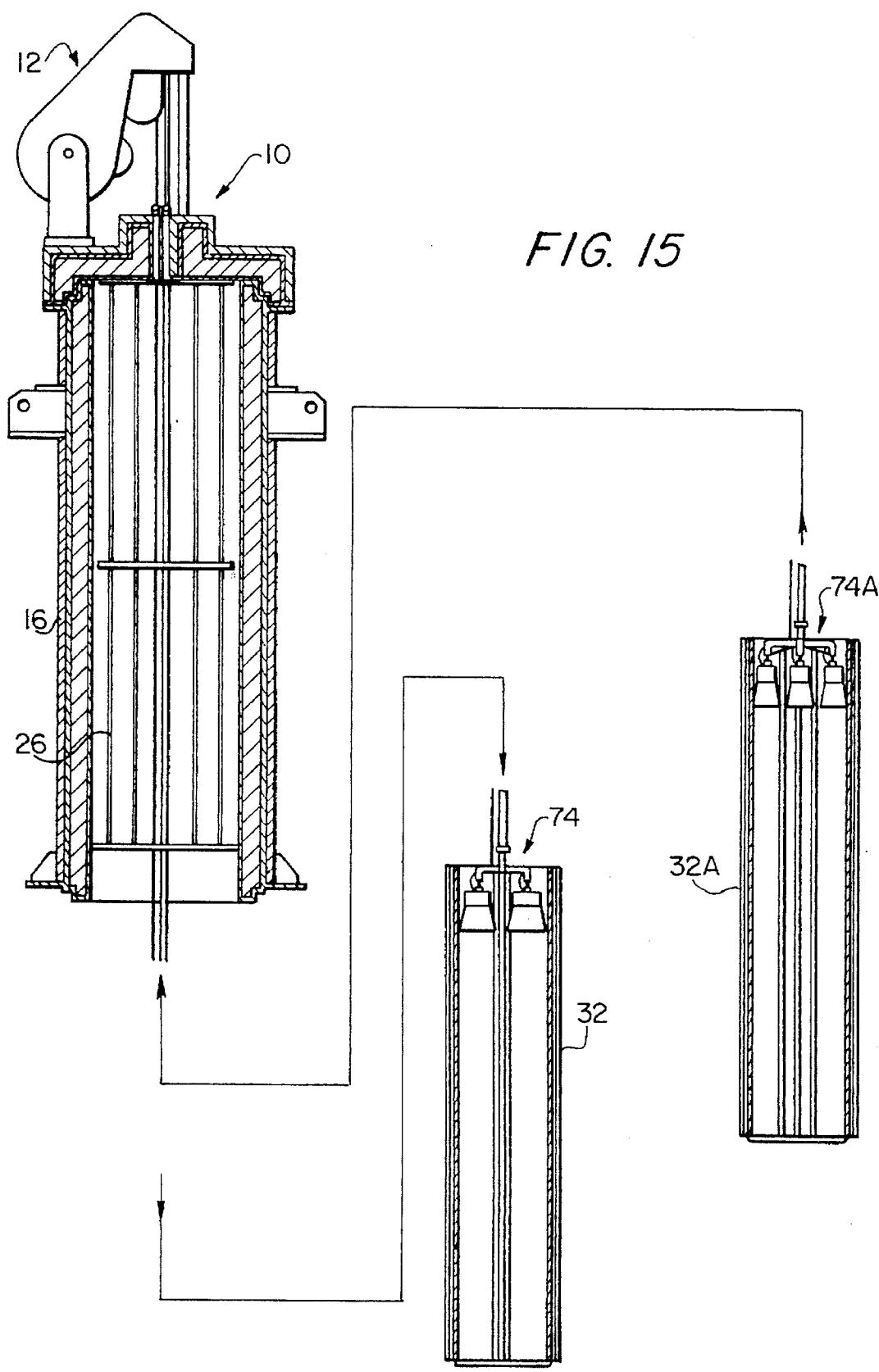
FIG. 15 illustrates the interchangeability of the sliding sleeve and the grapple assembly.

FIG. 15 illustrates the interchangeability of auxiliary sliding sleeve 32A with standard sliding sleeve 32, and the interchangeability of auxiliary common grapple bracket 74A of grapple assembly 75 with standard common grapple bracket 74. The arrows show the removal of the standard sliding sleeve 32 and the installation of the auxiliary sliding sleeve 32A. The sliding sleeve and grapple assembly are lowered through and out of the transfer container body 16. At that position the sliding sleeve is not held by the guide rails. The common grapple bracket 74 is disconnected from the lifting cable 34 and the grapple control cable 36 is disconnected from its end fitting. The auxiliary common grapple bracket 74A and grapple control cable are connected to the lifting cable and grapple control cable end fitting, respectively. The auxiliary sliding sleeve 32A and common grapple bracket 74A are then raised into the transfer container body by the integral lifting hoist 12 while aligning the auxiliary sliding sleeve 74A onto the guide rails 26.

Figure 18:
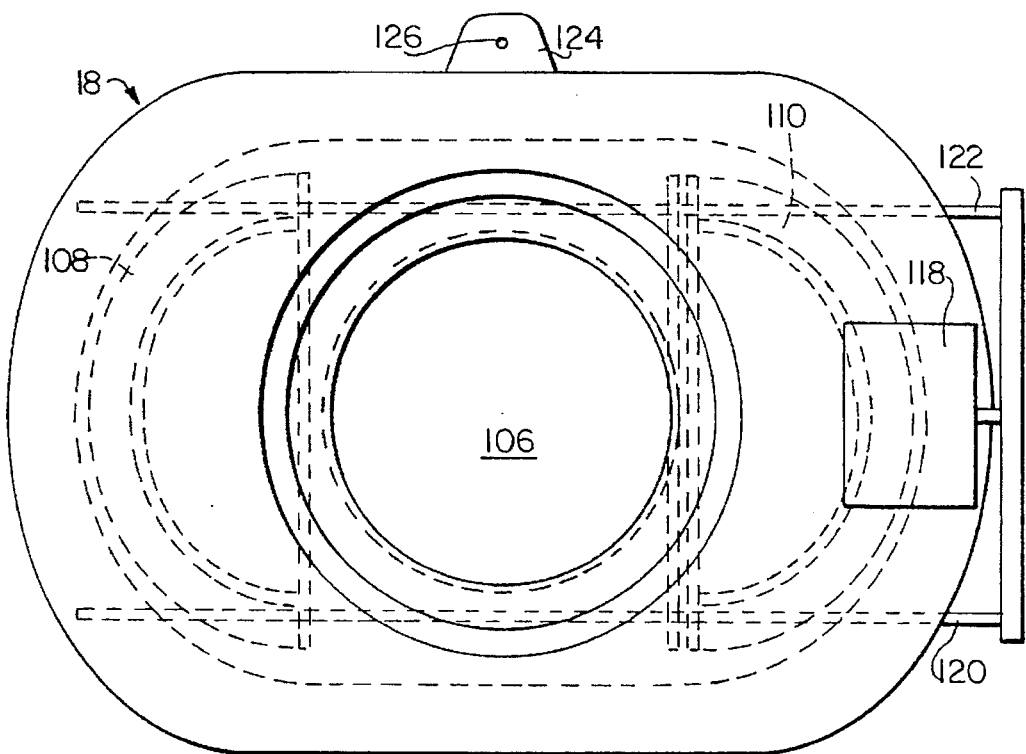
FIG. 18 is a plan view of the shielded gate.
Figure 17:
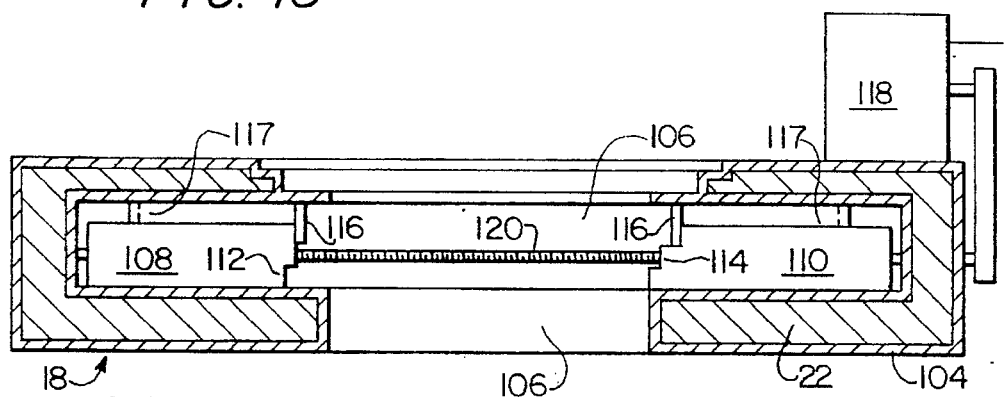
FIG. 17 is an elevational view in cross-section of the shielded gate with the gate doors in the open position.
Figure 16:
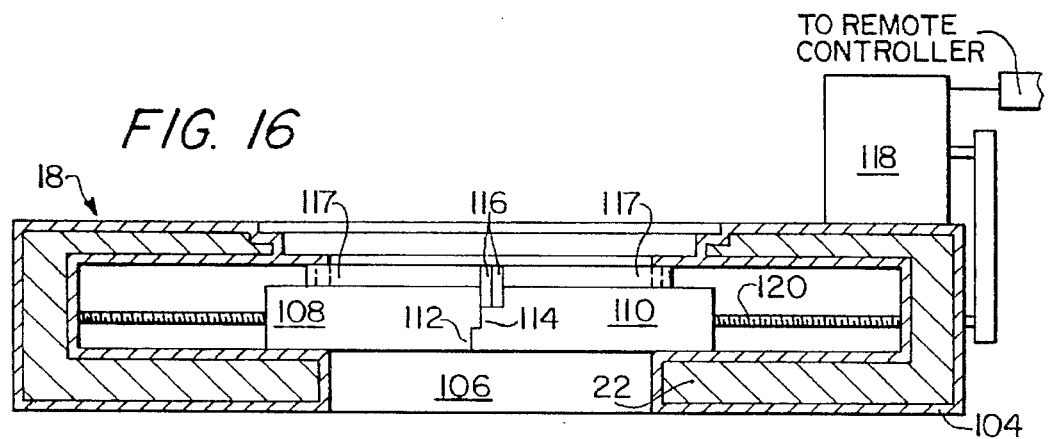
FIG. 16 is an elevational view in cross-section of the shielded gate of the present invention with the gate doors in a closed position.

Sliding sleeve 32 passes into and out of container body 16 through shielded gate 18. Gate 18, as shown in detail in FIGS. 16, 17 and 18, mounts to the lower end of container body 16 via a rabbeted fit (see FIG. 3, for example) and is connected to body 16 by a bolted flange or and other suitable fasteners. As best shown in FIGS. 16 and 17, gate 18 is constructed with a steel shell 104 that encloses shielding material 22. Gate 18 includes an opening 106 in its center that may be circular (as shown) or rectangular, but appropriately sized and shaped to allow passage of sliding sleeve 32 vertically through it. Mounted within shell 104 of gate 18 are two doors 108, 110, preferably semicircular (as shown in phantom in FIG. 18). Doors 108, 110 translate horizontally within gate 18 toward and away from one another to close and open, respectively, gate opening 106. Doors 108 and 110 each include a double stepped mating interface 112 and 114, respectively for creating a double seal when the doors are closed together. Seals 116 and 117 are provided for the mating and sealing faces of the doors so that the interior of the transfer container can be sealed and pressurized or purged with inert gas. Doors 108, 110 are actuated by an external power source such as gear motor 118 that drives a linked pair of opposed thread Acme type screws 120, 122. Gear motor 118 is preferably electrically connected to and controlled by remote controller 66, and remote control panel 72, preferably, provides an indication of the status (i.e. closed, open) of doors 108, 110. Shell 104 has connected thereto lips 124 (FIG. 18) each with an alignment hole 126 that mates with a corresponding pin that extends up from an adapter plate 128 (FIG. 22) on a loading stand assembly 132 (FIG. 19), as will be discussed in detail hereinafter. Holes 126 and the pins of the adapter plate ensure that transfer container 10 is properly aligned with the fuel basket in the loading stand when the transfer container is landed on the loading stand.

Figure 19:
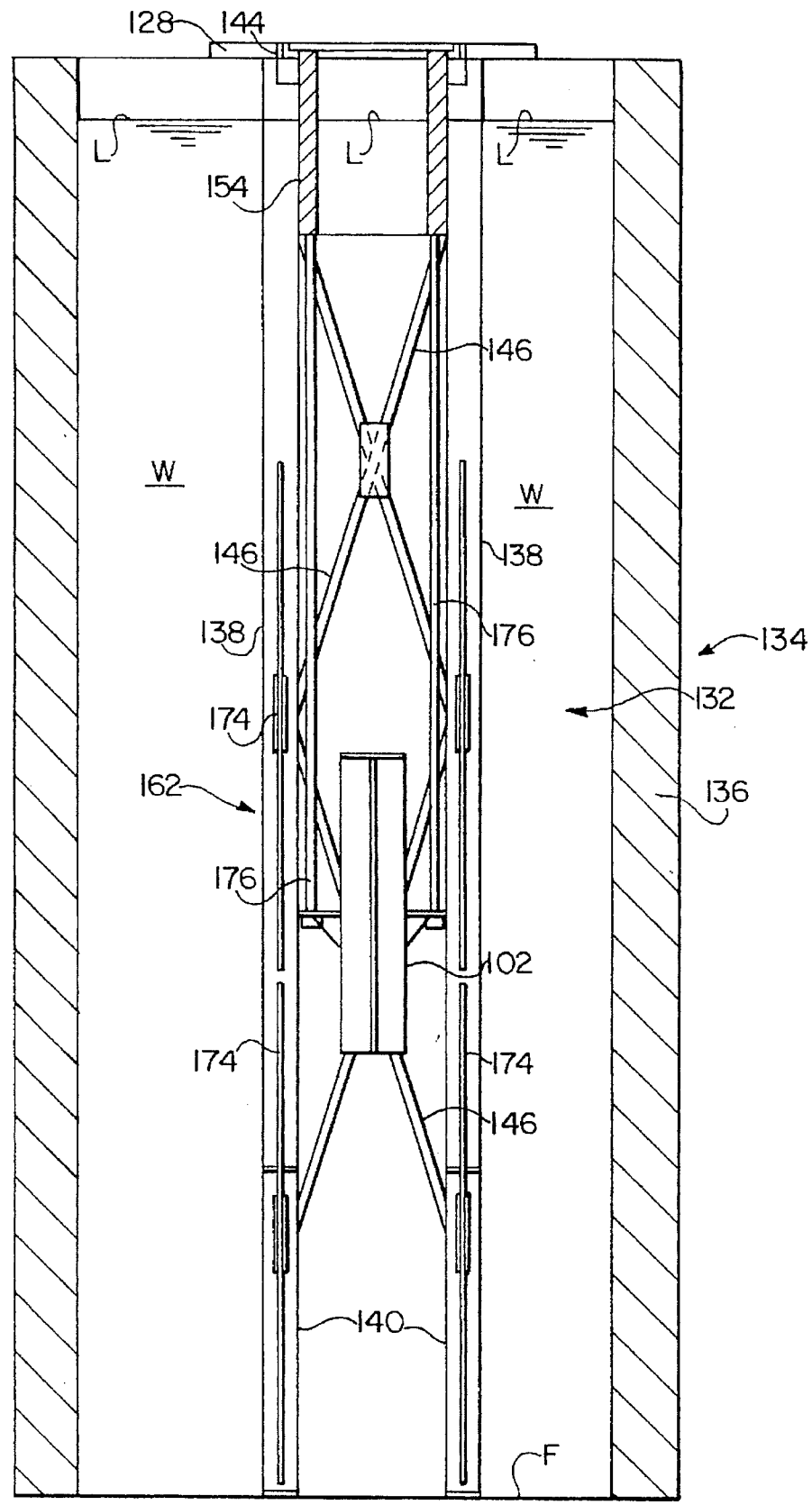
FIG. 19 is an elevational, cross-sectional view of the loading stand assembly of the present invention.

Fuel assemblies, e.g. spent nuclear fuel (SNF) rods, are transferred into transfer container 10 from a spent nuclear fuel (SNF) storage pool 134 utilizing the loading stand assembly 132, as best shown in FIG. 19. The SNF storage pool 134 is typically located near a nuclear reactor to store spent fuel assemblies under water. As shown in FIG. 19, water W is maintained at a level L within the walls 136 of the pool. In order to transfer the spent fuel assemblies out of pool 134, loading stand assembly. 132 is placed in the pool so that it is underwater except at its uppermost region. The loading stand includes a number of support columns 138 that provide the primary structural support for the assembly. Columns 138 are preferably adjustable in length by adding sections, e.g. lower sections 140 in FIG. 19, so that the loading stand assembly 132 extends from the floor F of the pool to the top of the pool. Columns 138 are tied together by bracing 146 and 174. As best shown in FIGS. 20 and 21, each support column 138 includes a pin 144 for engaging a corresponding hole 148 in loading stand adapter plate 128. Shims 142 (FIG. 21) are placed over pins 144 on top of columns 138 as necessary to level the loading stand adapter plate 128 when it is placed on top of the columns 138. Shims 142, which are thin disks or washers, permit the level of each of the four corners of the adapter plate to be adjusted to compensate for any unevenness in the floor F of the storage pool 134.

Loading stand adapter plate 128 (FIG. 22) is mounted on top of the loading stand support columns 138 (see FIG. 19, for example) and may be shimmed at the mounting interface to level the adapter plate, as described above with reference to FIG. 21. Plate 128 includes a slot 150 to allow the pool fuel handling crane (not shown) to move fuel from storage racks (not shown) in the pool to the fuel basket 102 in the loading stand assembly. The center of plate 128 includes opening 152 that is dimensioned to accept the transition shield 154 and includes a lip 156 that supports transition shield 154, which is also slotted to permit movement of the fuel handling tool. Loading stand adapter plate 128 includes alignment pins 158 that are received in holes 126 of shielded gate 18 (FIG. 18) to properly align the transfer container 10 when it is loaded onto the loading stand assembly. Loading stand assembly 132 can be secured to withstand earth vibrations, such as seismic events, by deck anchored holddown supports 178 attached on one end to the loading stand adapter plate 128 and appropriately anchored on their opposite end to the ground or a deck (not shown).

Figure 22:
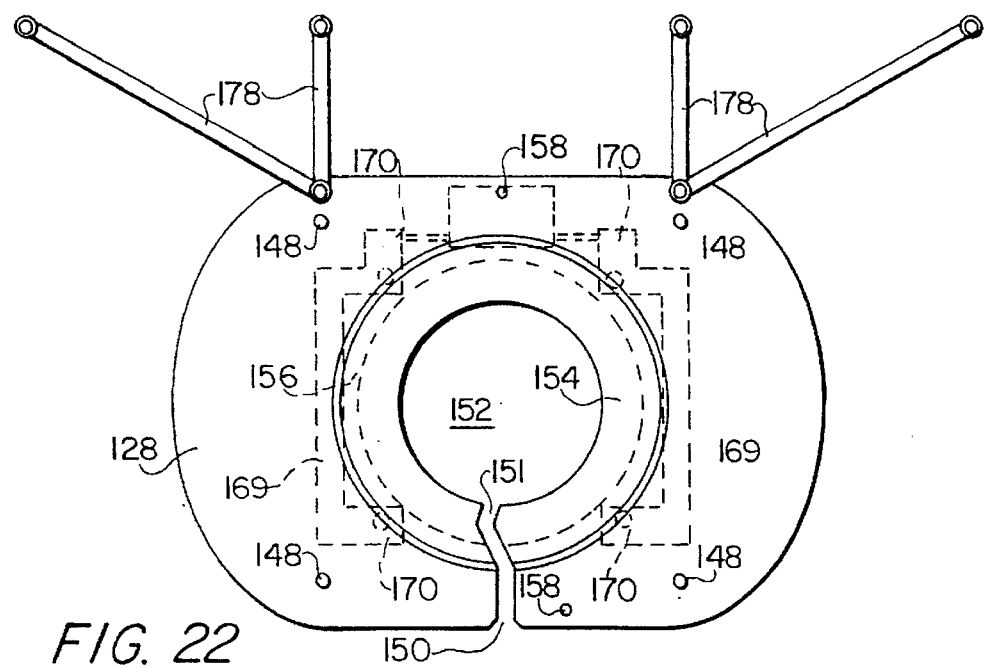
FIG. 22 is a plan view of the loading stand adapter plate of the present invention.

The transition shield 154 is a shielded structure as best seen in FIGS. 19 and 22) that is open on the top and bottom and mounted within the loading stand support columns 138. A serpentine slot 151 is provided in the front of the shield to provide access for a fuel handling tool (not shown) to pass when transferring fuel assemblies into the fuel basket 102. The inner dimensions are sized to allow passage of the sliding sleeve 32 of the transfer container and entry from below of the fuel basket 102 as it elevates the fuel assemblies above the surface of the water for removal from the pool. The transition shield 154 is located such that its top is even with the top of the loading stand adapter plate 128. Part of the shield is below the pool water and part of the shield is above the water. In cross section its construction is generally similar to that of the transfer container body 16 and functions to provide radiation shielding for fuel assemblies as they are removed from the pool and drawn up through the shielded gate 18 into the transfer container.

The fuel basket 102 as best shown in FIGS. 23 and 24 provides a number of compartments 160 for receiving fuel assemblies from the fuel storage pool fuel movement crane (not shown) as the fuel is moved from the fuel storage racks (not shown) in the storage pool. When the basket is loaded, the loading stand elevator 162 lifts the SNF basket vertically into the transition shield 154 and partially out of the water. The upper limit of travel is defined by the outer flange 164 of the basket 102 which mates with the bottom surface of the transition shield 154. As shown in FIG. 26, flange 164 of basket 102 includes alignment pins or bars 165 that are received in corresponding holes or channels 167 of transition shield 154 as basket 102 is raised in the direction of the arrows by the loading stand elevator. The upper surface of the basket provides a locating feature (i.e. flanged lip 103) which mates with and aligns the sliding sleeve 32 as it is lowered from the transfer container, as previously described with reference to FIG. 14. This aligns the grapples of the transfer container with the standard grapple points on top of the fuel assemblies within the basket. Basket 102 is preferably constructed in a geometrical configuration that effects a spatial relationship between fuel assemblies to ensure subcriticality of the fuel assemblies while in the basket and matches that of the sliding sleeve 32. Such configuration must be determined for each application (i.e. type, shape, etc. of fuel assemblies to be handled) of the present invention using techniques well known in the art. Alternately, or additionally, basket 102, (including walls 166) is constructed of a neutron absorbing material (neutron poisons), e.g. boron or material containing boron as a component. FIG. 25 shows an alternate or auxiliary embodiment 102A of the fuel basket that is capable of accepting up to eight fuel assemblies and matches the sliding sleeve 32A.

Figure 27:
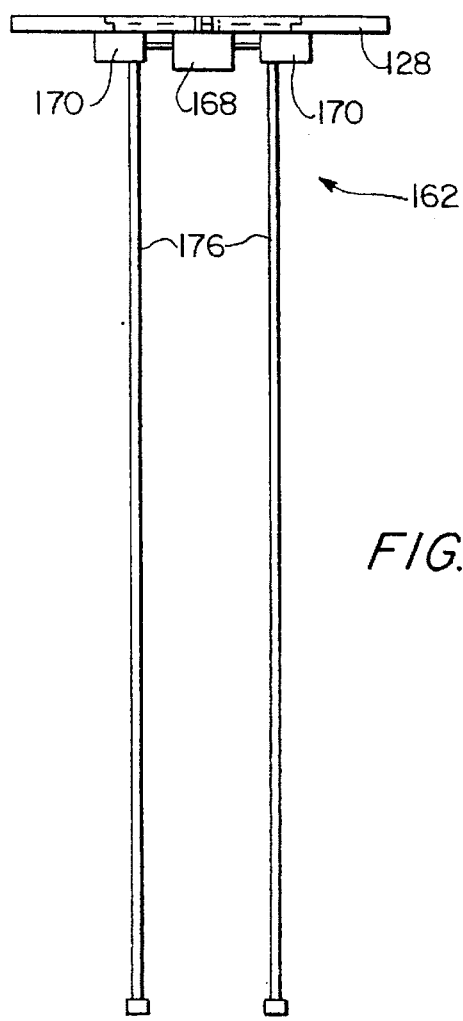
FIG. 27 is an elevational view of the loading stand elevator of the present invention.
Figure 28:
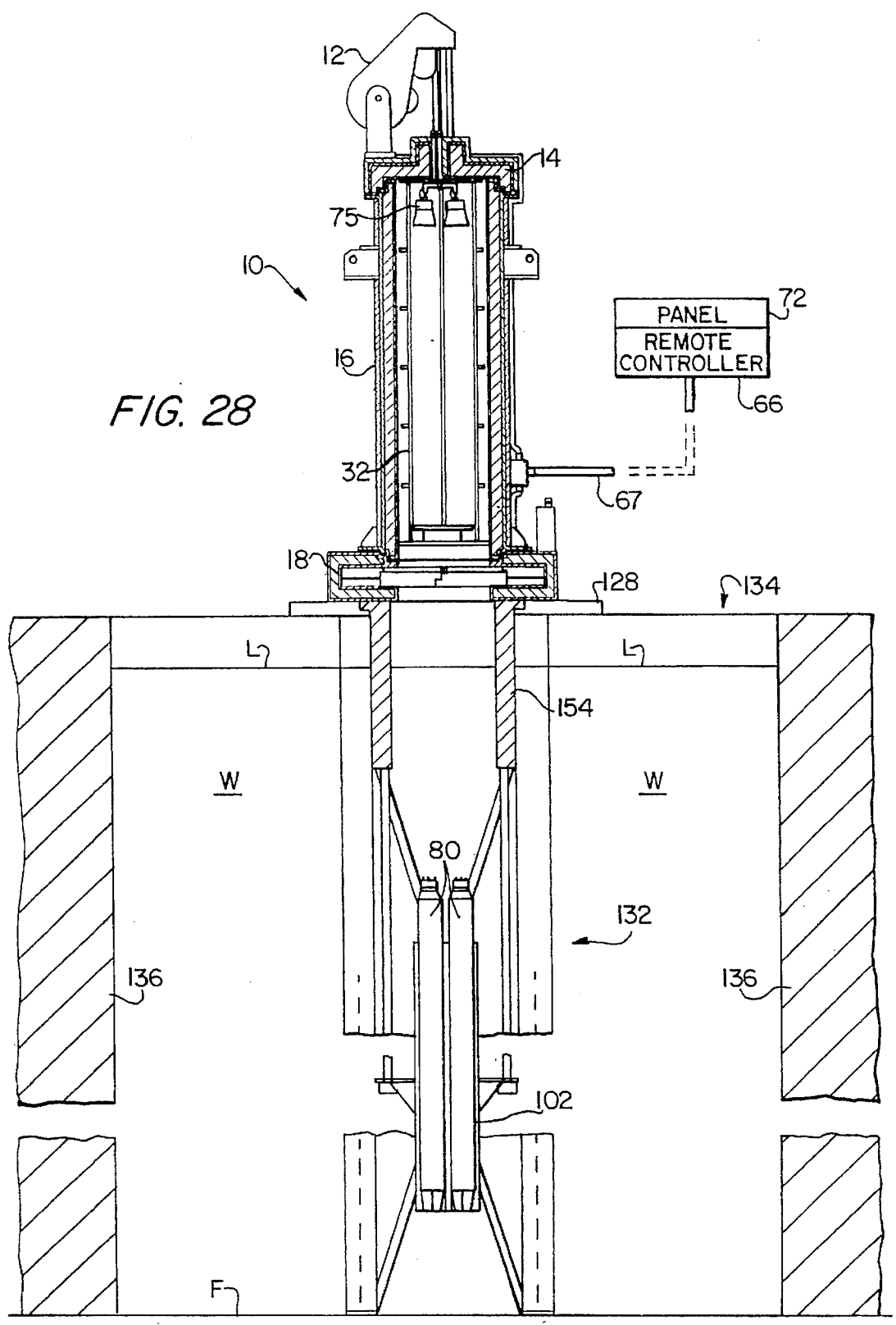
FIGS. 28 through 31 are elevational views in cross-section showing various operational stages of the transfer container and loading stand assembly of the present invention.

The loading stand elevator 162 (FIG. 27) raises and lowers fuel basket 102 from a point above the floor F of the SNF storage pool up to the basket unloading position which is partially above the pool water and partially within the transition shield 154. Elevator 162, as best seen in FIG. 27, is preferably a cable drive system powered by an electrical hoist motor 168 which drives stowage drums 170 and linking mechanical drives 169 which are mounted to the underside of adapter plate 128. Motor 168 drives four hoist drums 170 that provide a balanced lift of fuel basket 102 as it is raised and lowered. Lift cables are channeled within the elevator guide slotted tubes 176 (FIG. 19). Basket 102 rides on and is guided by elevator guide tubes 176 that are passed through holes 180 in basket flange 164 (FIG. 24).

The operation of the present invention will now be described in the environment of a nuclear site. Standard equipment and procedures are mentioned but not described in detail herein as such equipment and procedures are well known in the art.

Prior to the commencement of spent nuclear fuel (SNF) transfer operations, the appropriate equipment is assembled both in the wet cask loading area of the site's SNF storage pool and in an appropriate dry cask loading area. The loading stand 132 is assembled and lowered into the site's SNF storage pool. A discharge stack-up is assembled in the designated dry cask loading area. An exemplary discharge stack-up is disclosed in U.S. Pat. No. 5,319,686, having the same assignee as the present patent application, and incorporated in its entirety herein by reference.

To commence SNF transfer operations, the fuel assemblies 80 will be transferred from locations in fuel storage racks to positions in the fuel basket 102 of the loading stand. This transfer is accomplished by the use of the storage pool's standard fuel handling crane. An appropriate number of pressurized water reactor (PWR) or boiling water reactor (BWR) fuel assemblies 80, or other fuels or high level waste may be transferred into the fuel basket 102 each transfer cycle.

The appropriate access hatches or doors to the storage pool building are opened and the transfer container 10 is brought into the storage pool area. The transfer container 10 is landed on the loading stand 132 (FIG. 28) while being properly located by the alignment pins 158 on the loading stand adapter plate 128. The movement of the transfer container may be accomplished by the use of an approved on-site crane.

Figure 29:
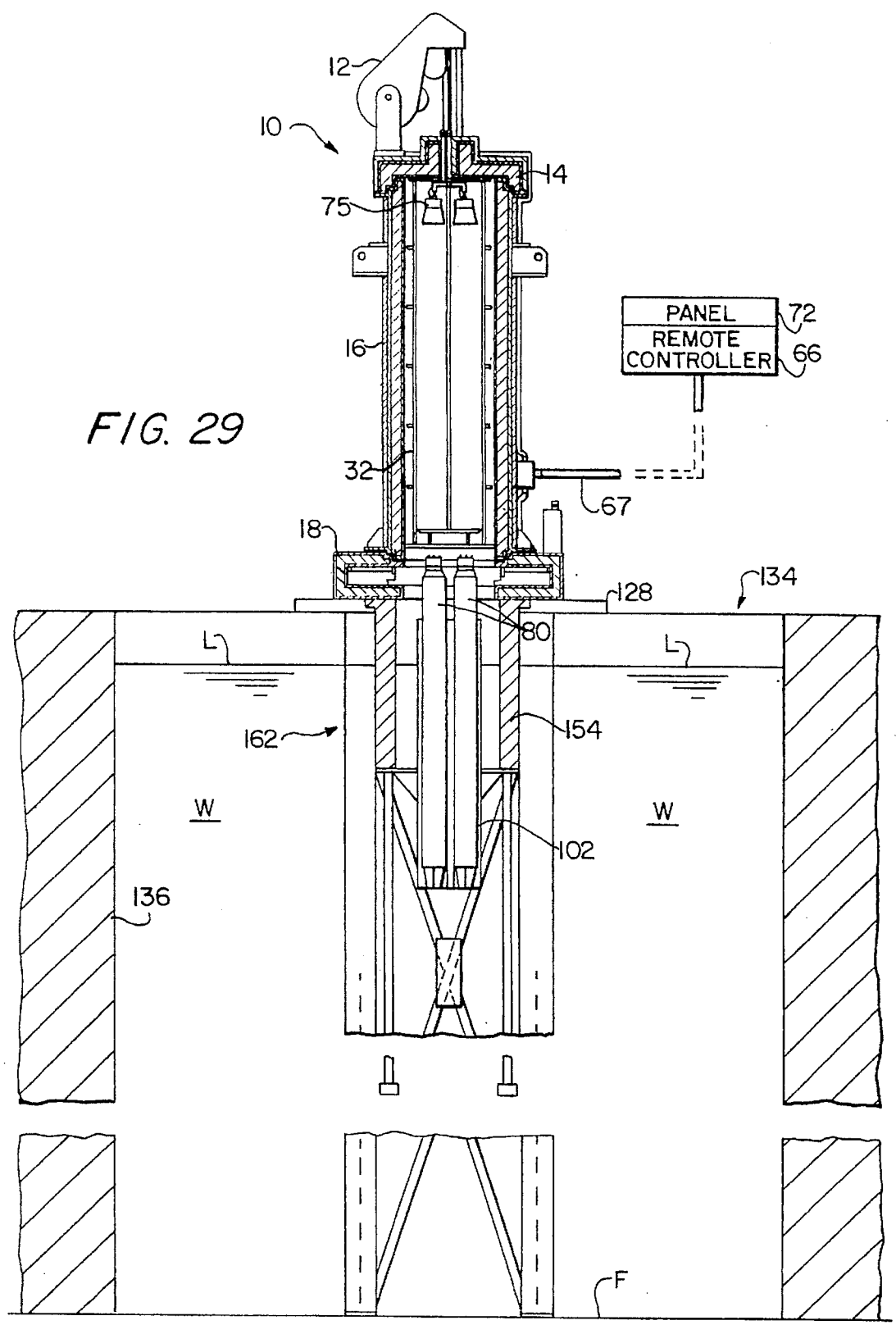

Once the transfer container 10 is seated on the loading stand 132, power, the remote controller 66 and the remote control panel 72 are connected to the transfer container and the electronic equipment is allowed to warm up. The remote control panel 72 and remote controller 66 are located in a low radiation area away from the transfer container to minimize personnel radiation exposure. The shielded gate 18 is then opened, via the remote control panel 72, providing an opening for the grapple assembly 75 and the sliding sleeve 32 to pass through. Prior to lowering the grapple assembly and sliding sleeve, the loading stand elevator 162 is activated and the fuel basket 102, with the fuel assemblies to be transferred, is raised to a height which ensures that the top of the fuel basket is above the surface of the storage pool water and within the transition shield 154 (FIG. 29). This reduces contamination of the grapple assembly and sliding sleeve while grappling fuel assemblies.

Figure 30:
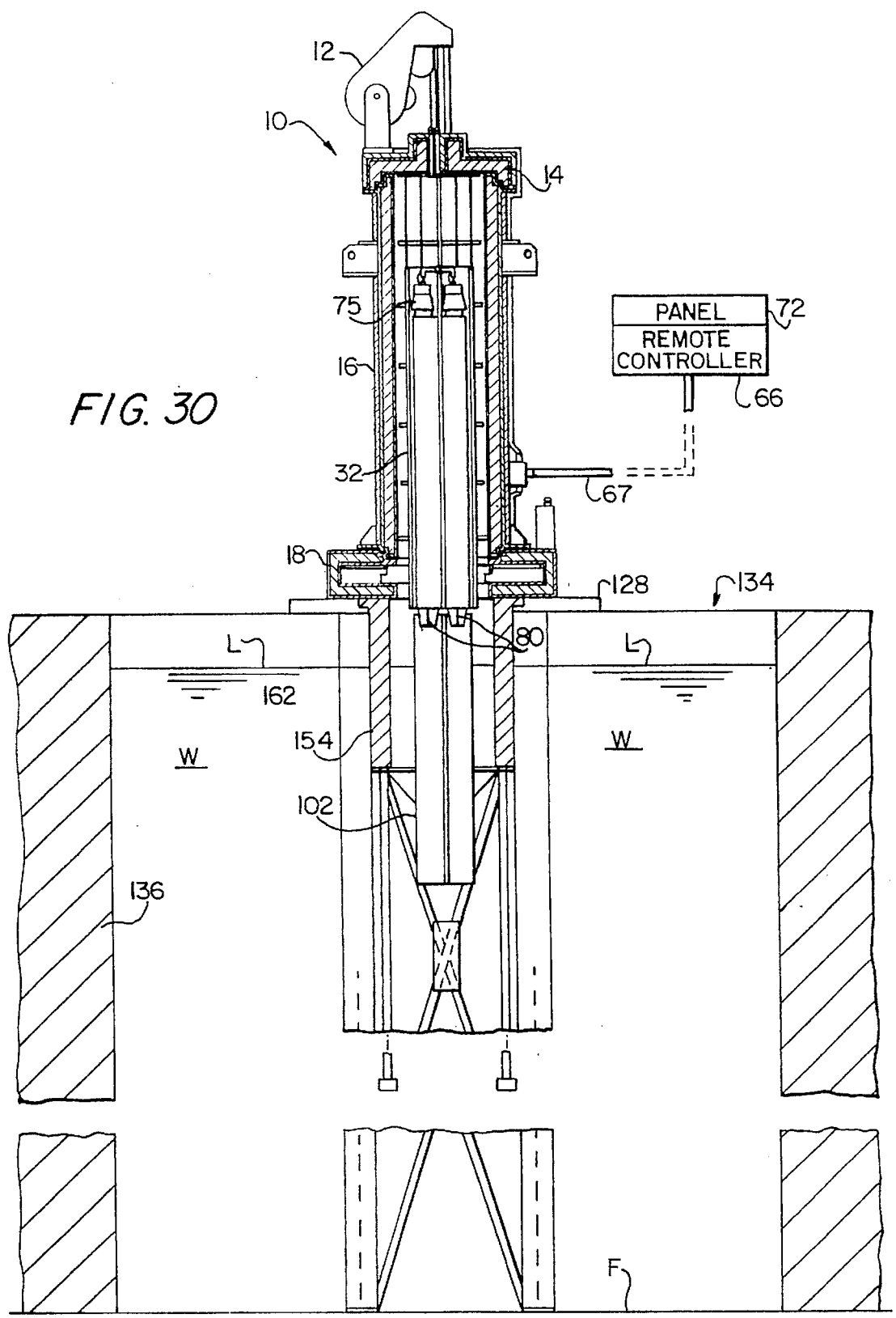

With the fuel basket in the raised position, the transfer container grapple assembly 75 and sliding sleeve 32 are lowered, via the remote control panel 72, to rest atop the fuel basket and over the fuel assemblies (FIG. 30). The grapples are actuated remotely and latched to the fuel assemblies. Latching is confirmed by a series of electric sensors and the measurement of the proper weight is confirmed as displayed on the remote control panel. The grapple is designed to prevent the latching mechanism from releasing while the grapple is holding the weight of the fuel assembly. This ensures that inadvertent operation of a release button on the remote control panel, while raising or lowering the fuel assembly does not cause the grapple to release. Once latched, the grapple assembly, sliding sleeve, and all the fuel assemblies are raised into the transfer container. The sliding sleeve, which travels with the grapple assembly, ensures by proper fuel spacing that the fuel assemblies remain in a subcritical arrangement. In addition, the sliding sleeve is designed to protect the integrity of each fuel assembly and minimize any possible interference by continuously guiding each fuel assembly as it is removed from the fuel basket.

Figure 31:
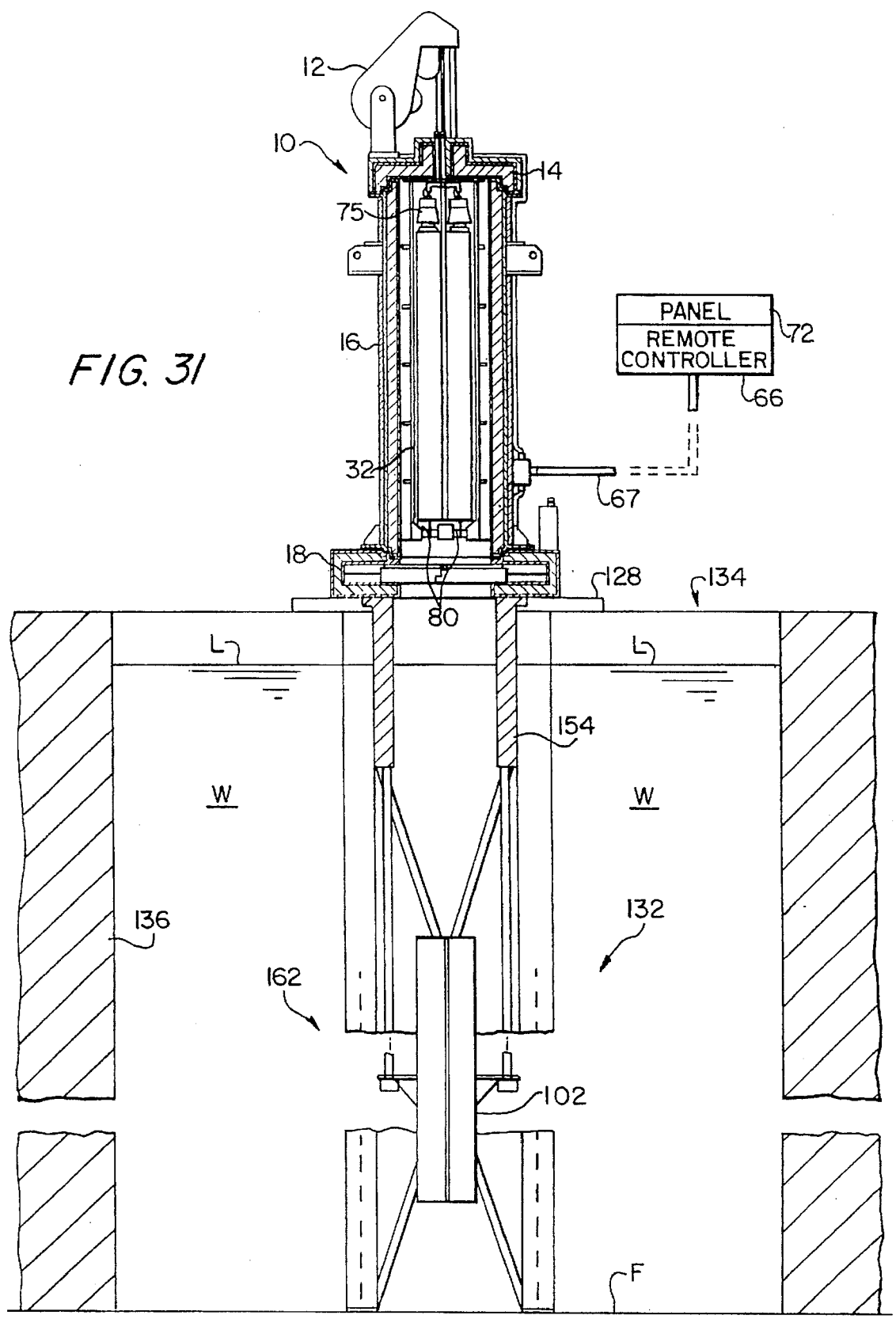

Once the grapple assembly, sliding sleeve, and fuel assemblies are completely raised into the transfer container, the grapple assembly, with the fuel assemblies attached, is automatically secured in the transfer container. The loading stand elevator is activated to lower the fuel basket. The transfer container shielded gate is activated, via the remote control panel, to close and seal the bottom of the transfer container (FIG. 31). Then, the power and remote control panel are disconnected from the transfer container. Once the SNF basket is in its lower position, the transfer container is lifted off of the loading stand and moved to an SNF cask loading area by the on-site crane. The above process is then reversed to unload the fuel assemblies from the transfer container and into an SNF cask. The emptied transfer container is then moved back again onto the loading stand in the storage pool and additional fuel assemblies are loaded therein.

We claim:

1. An apparatus for the transfer of nuclear fuel assemblies comprising;

a plurality of loading stand support columns that extend vertically from the bottom of a fuel pool floor to the top of said fuel pool;

a basket, supported for vertical travel within said support columns, for receiving a plurality of fuel assemblies from fuel storage racks in said pool; and an elevator for raising and lowering said basket; and
further including a transfer container for receiving said plurality of fuel assemblies from said basket, and wherein
said basket includes means for mating with said transfer container to ensure proper alignment between said transfer container and said basket.

2. An apparatus as in claim 1 further including a transition shield mounted within said support columns and extending vertically such that a portion of said shield extends above the level of water in said pool and a portion extends below water in said pool.

3. An apparatus as in claim 2 further including a loading stand adapter plate mounted on top of said support columns for supporting said elevator.

4. An apparatus as in claim 3 wherein said adapter plate includes a hole for receiving said transition shield and including a support lip around said hole for engaging a corresponding lip on said transition shield to partially support said shield.

5. An apparatus as in claim 3 wherein each said support column includes a pin at the top of each column and said adapter plate includes a plurality of holes for receiving said column pins.

6. An apparatus as in claim 5 including at least one shim mounted on at least one said column pin and beneath said adapter plate for levelling said adapter plate.

7. An apparatus as in claim 3 further including a plurality of vertical guides mounted to said loading stand adapter plate for guiding the vertical travel of said basket.

8. An apparatus as in claim 3 further including means for vertically locating said basket in its uppermost position within said support columns and relative to said adapter plate.

9. An apparatus as in claim 8 wherein said locating means includes an outer flange connected to said basket, said flange limiting upper vertical travel of said basket by contact of said flange with a bottom surface of said transition shield.

10. An apparatus as in claim 9 wherein said flange includes vertical extension members and said transition shield includes openings for receiving said extensions.

11. An apparatus as in claim 10 wherein said extensions are pins.

12. An apparatus as in claim 1 wherein said transfer container comprises an elongated hollow body and a sleeve for sliding vertically within said body, said sleeve including a plurality of compartments, each of said compartments for receiving a fuel assembly from said basket, and wherein said means for mating ensures proper alignment between said sleeve and said basket.

13. An apparatus as in claim 1 further including a transfer container comprising an elongated hollow body and a sleeve for sliding vertically within said body, said sleeve including a plurality of compartments, each of said compartments for receiving a fuel assembly from said basket, and wherein said basket includes means for mating with said sleeve to ensure proper alignment between said sleeve and said basket.

14. An apparatus as in claim 13 further including a loading stand adapter plate mounted on top of said support columns for supporting said elevator and wherein said loading stand adapter plate includes means for aligning said transfer container with said basket.

15. An apparatus as in claim 14 wherein said means for aligning includes pins on said adapter plate and corresponding holes in said transfer container.

16. An apparatus as in claim 13 wherein said mating means includes a flanged lip on said basket for receiving a corresponding flange on said sleeve.

17. An apparatus as in claim 13 further including a hoist cable and a hoist connected to said hoist cable for lowering and raising said cable vertically within said transfer container;
a plurality of grapples connected to said hoist cable for latching onto a corresponding plurality of fuel assemblies supported in said basket in a raised position, whereby said grapple assembly and hoist cable are operable to raise said latched fuel assemblies from said basket and into said sleeve without immersion of said grapple assembly and cable into water contained in said fuel pool.

18. An apparatus as in claim 1 wherein each of said loading stand support columns comprises at least one removable vertical section, whereby said columns are adjustable in height to accommodate varying fuel pool depths.

19. An apparatus as in claim 1 wherein said basket comprises a plurality of compartments configured to provide a separation distance between fuel assemblies received in said compartments, whereby said separation distance aids in maintaining subcriticality of said fuel assemblies in said compartments.

20. An apparatus as in claim 19 wherein said basket compartments are constructed of a material containing a neutron absorbing material as a component to further aid in maintaining subcriticality of said fuel assemblies.

21. An apparatus as in claim 20 wherein said neutron absorbing material is boron.

22. An apparatus as in claim 1 wherein said basket is removable from said elevator to allow interchange of said basket with another basket to accommodate varying size and numbers of fuel assemblies.

23. An apparatus as in claim 1 further including anchored supports connected to said columns for securing said columns to withstand earth vibrations.

24. A method for transferring nuclear fuel assemblies comprising:
placing a loading stand assembly including a plurality of loading stand support columns into a fuel pool containing water such that said support columns extend vertically from a floor of said fuel pool to the top of said fuel pool;
supporting a basket within said support columns; receiving a plurality of fuel assemblies in said basket;
raising said basket with said plurality of fuel assemblies received therein;
positioning a transfer container over said loading stand assembly; and
raising a plurality of fuel assemblies from said basket into said transfer container.

25. A method as in claim 24 further including the step of mounting a transition shield within said support columns such that a portion of said shield extends above the level of water in said pool and a portion extends below water in said pool.

26. A method as in claim 25 wherein said step of raising said basket includes raising said basket into said transition shield and partially out of said water in said pool.

27. A method as in claim 26 wherein said step of raising said basket into said transition shield includes the step of aligning said basket with said transition shield.

28. A method as in claim 24 further including the step of mounting an adapter plate on top of said support columns.

29. A method as in claim 28 further including the step of placing at least one shim beneath said adapter plate to level said adapter plate.

30. A method as in claim 28 wherein said step of raising said basket includes the step of vertically locating said basket in an uppermost position within said support columns and relative to said adapter plate.

31. A method as in claim 24 wherein said transfer container has an elongated hollow body and further including the steps of:

lowering a sliding sleeve from said body to a position directly over said basket;

raising a plurality of compartments included in said sliding sleeve; and raising said sliding sleeve with said fuel assemblies completely within said transfer container body.

32. A method as in claim 31 wherein said steps of lowering and raising said sliding sleeve includes the steps of lowering and raising, respectively, a grapple assembly in engagement with said sliding sleeve.

33. A method as in claim 32 further including the step of latching a plurality of grapples onto a corresponding plurality of fuel assemblies in said basket prior to said step of raising a plurality of fuel assemblies from said basket and into said sliding sleeve.

34. A method as in claim 33 wherein said step of latching includes actuating grapples independently whereby selected fuel assemblies can be latched.

35. A method as in claim 31 further including the step of mating said sleeve with said basket to ensure proper alignment therebetween.

36. A method as in claim 24 further including the step of adjusting the height of said loading stand support columns to accommodate varying fuel pool depths.

37. A method as in claim 36 wherein said height adjusting step includes the step of removing at least one vertical section from each of said loading stand support columns.

38. A method as in claim 36 wherein said height adjusting step includes the step of adding at least one vertical section to each of said loading stand support columns.

39. A method as in claim 24 further including the step of constructing said basket with a plurality of compartments configured to provide a separation distance between fuel assemblies received in said compartments, whereby said separation distance aids in maintaining subcriticality of said fuel assemblies in said compartments.

40. A method as in claim 39 further including the step of constructing said basket compartments of a material containing a neutron absorbing material as a component to further aid in maintaining subcriticality of said fuel assemblies in said compartments.

41. A method as in claim 40 further including the step of constructing said basket compartments of a material containing boron as a component to further aid in maintaining subcriticality of said fuel assemblies in said compartments.

42. A method as in claim 24 further including the step of interchanging said basket with another basket to accommodate varying size and numbers of fuel assemblies.

43. A method as in claim 24 further including the step of connecting said loading stand support columns to anchored supports for securing said columns to withstand earth vibrations.

* * * * *